(12) United States Patent
Cho et al.

(10) Patent No.: US 7,464,387 B2
(45) Date of Patent: Dec. 9, 2008

(54) STACK TYPE DISK CHANGER

(75) Inventors: Won-Hyung Cho, Seoul (KR); Jae-Won Jang, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 715 days.

(21) Appl. No.: 11/027,521

(22) Filed: Dec. 29, 2004

(65) Prior Publication Data

US 2005/0144628 A1 Jun. 30, 2005

(30) Foreign Application Priority Data

Dec. 31, 2003 (KR) ...................... 10-2003-0102241

(51) Int. Cl.
*G11B 17/22* (2006.01)
*G11B 17/04* (2006.01)
(52) U.S. Cl. .................................... 720/614; 369/30.92
(58) Field of Classification Search ............. 369/30.92, 369/30.93–30.98; 720/614
See application file for complete search history.

(56) References Cited

U.S. PATENT DOCUMENTS 5,970,036 A * 10/1999 Matsugase .................. 720/614
5,987,001 A * 11/1999 Ishioka et al. ............ 369/30.93
6,031,811 A 2/2000 Umesaki et al.
6,188,664 B1 * 2/2001 Nakayama ............... 369/30.84
7,246,363 B2 * 7/2007 Morioka et al. ............. 720/614
7,296,278 B2 * 11/2007 Jang et al. ................... 720/614
2002/0163863 A1 11/2002 Kido
2003/0161225 A1 * 8/2003 Morioka et al. .......... 369/30.85

FOREIGN PATENT DOCUMENTS

| CN | 1155737 | 7/1997 |
|---|---|---|
| EP | 0 845 778 A2 | 6/1998 |
| EP | 1 033 710 A1 | 9/2000 |

* cited by examiner

*Primary Examiner*—William J Klimowicz
(74) *Attorney, Agent, or Firm*—Lee, Hong, Degerman, Kang & Waimey

(57) ABSTRACT

A stack type disk changer is capable of not only being designed to have a relatively small overall size and to be simple and mounting more many disks thereon, but also allowing a user to easily withdraw a desired tray and check disks mounted on the respective trays by withdrawing the entire trays in a stairway form.

25 Claims, 16 Drawing Sheets

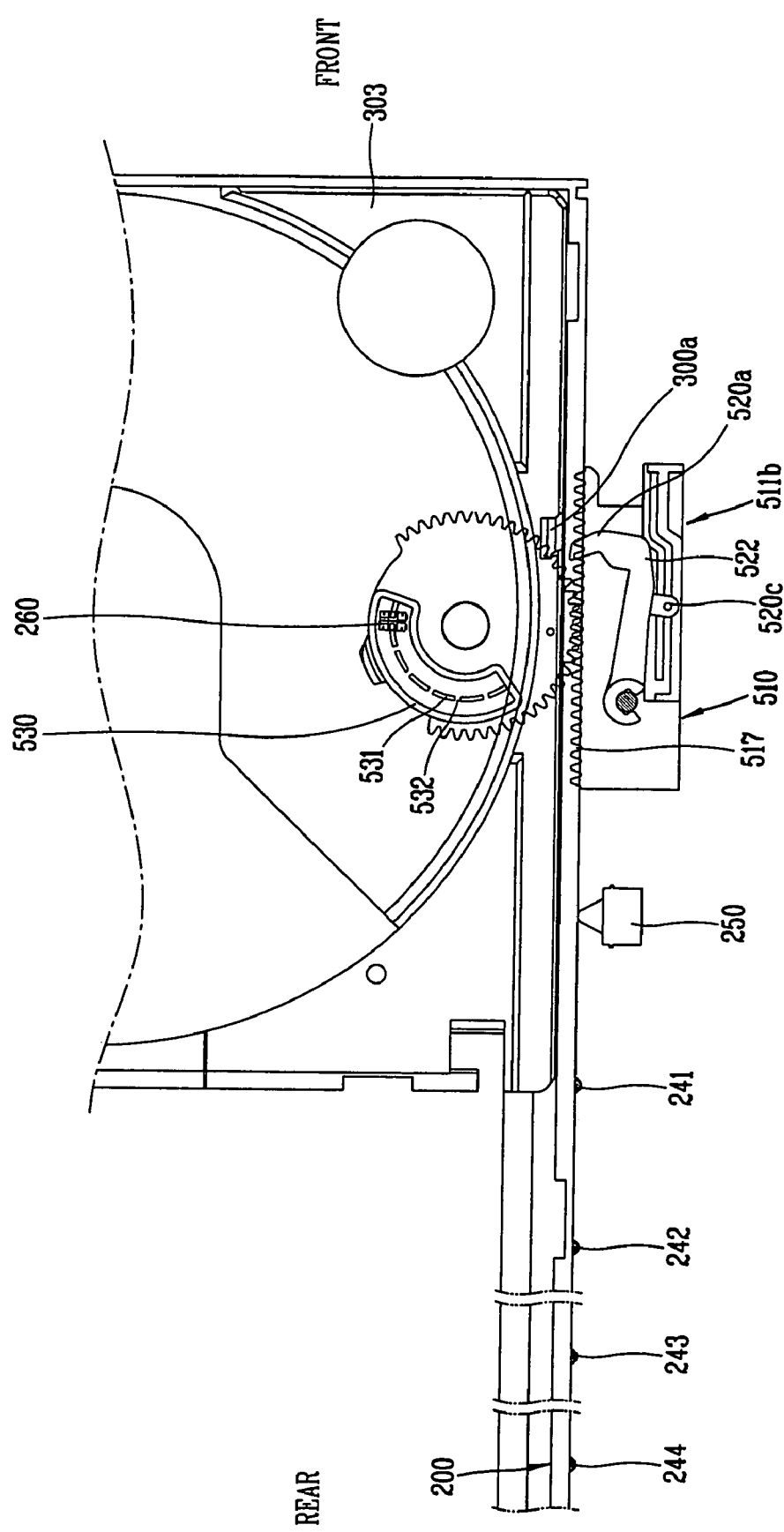

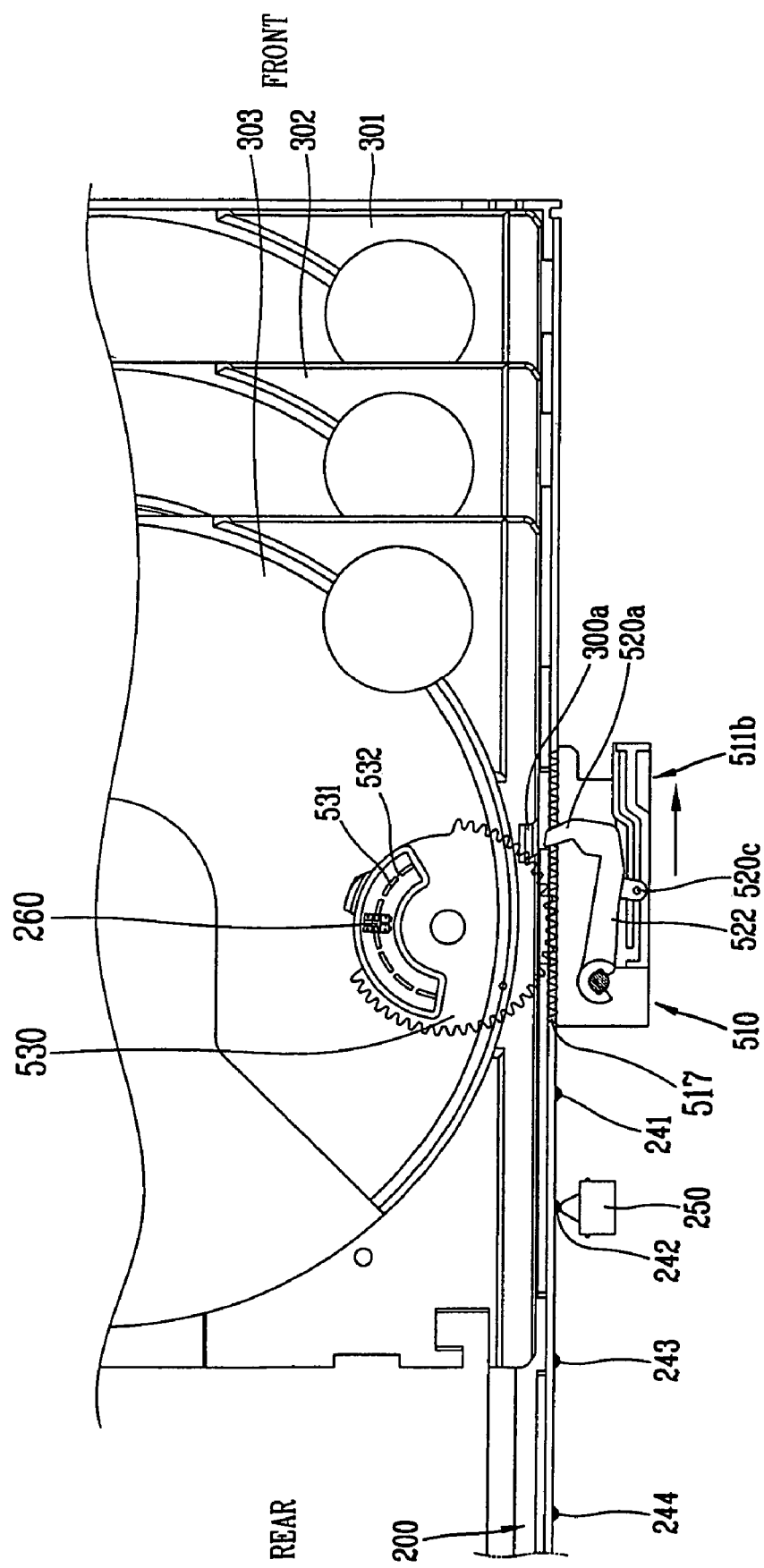

STACK TYPE DISK CHANGER

CROSS-REFERENCE TO RELATED APPLICATIONS

Pursuant to 35 U.S.C. § 119(a), this application claims the benefit of earlier filing date and right of priority to Korean Application No. 102241/2003, filed on Dec. 31, 2003, the contents of which are hereby incorporated by reference herein in their entirety.

BACKGROUND OF THE INVENTION

1. Field of the Invention

The present invention relates to a stack type disk changer, and more particularly, to a stack type disk changer capable of selectively withdrawing a specific tray desired by a user among a plurality of trays on which disks are mounted or withdrawing the entire trays in a stairway form.

2. Description of the Background Art

In general, a stack type disk changer is a device capable of reproducing a disk or recording information in a disk by exchanging a specific tray desired by a user after mounting multiple disks such as a CD (Compact Disk) or a DVD (Digital Versatile Disk) on trays.

In such a stack type disk changer, when a tray having a disk mounted thereon is loaded into a drive, a drive unit rotates the disk, and as an optical pick-up unit moves in a radial direction of the disk, information stored in the disk is reproduced or information is recorded in the disk or a specific tray desired by a user can be withdrawn.

FIG. 1 is a perspective view showing a rotary type disk changer in accordance with a conventional art.

As shown in FIG. 1, the conventional rotary type disk changer 10 includes a main body 1, a tray 2 installed to be slidable into the main body 1; a roulette 3 rotatably installed on the tray 2 and having a plurality of disk mounting units 4 for mounting a disk (not shown) thereon; an optical pick-up unit (not shown) installed inside the main body 1 and reproducing/recording information from/in one of disks mounted on the disk mounting units 4; and a clamper 5 installed at an upper portion of the optical pick-up unit and clamping the disk.

In the conventional rotary type disk changer, since the disk mounting units are radially arranged on the basis of a center of the roulette, it is difficult to mount more many disks, and in addition, since the overall size of the disk changer is too large, it is difficult to manage and carry the disk changer.

Moreover, when a user draws a cartridge out of the main body in order to check each tray or change an old disk to a new one, other trays than a specific tray desired by the user are also withdrawn, so it is difficult for the user to use it.

SUMMARY OF THE INVENTION

Therefore, an object of the present invention is to provide a stack type disk changer capable of not only being designed to have a relatively small overall size and to be simple and mounting more many disks thereon, but also allowing a user to easily withdraw a desired tray and check disks mounted on the respective trays by withdrawing the entire trays in a stairway form.

To achieve these and other advantages and in accordance with the purpose of the present invention, as embodied and broadly described herein, there is provided a stack type disk changer comprising: a main frame; a cartridge slidably installed in the main frame; a plurality of trays slidably and sequentially arranged in the cartridge and having locking grooves at side surfaces thereof; a tray selecting unit installed at a side surface of the main frame such that a specific tray among a plurality of trays can be unlocked when the cartridge is unloaded; and a driving unit installed in the main frame, for driving the tray selecting unit.

Through holes are formed at one side surface of the cartridge correspondingly to the respective locking grooves, and other through holes are formed at one side surface of the main frame in order to correspond to the respective through holes.

A receiving part is formed at one side surface of the main frame, and a rotary shaft is perpendicularly inserted into the receiving part.

The through holes of the main frame and the through holes of the cartridge communicate with each other in a state that the cartridge is received in the main frame.

The tray selecting unit draws a specific tray desired by a user or the entire trays out of the main frame by arranging the trays in a stairway form in order the user can check disks of each tray.

The tray selecting unit comprises: a cam gear part rotatably installed at the main frame; a plurality of levers rotatably installed at a side surface of the main frame to be locked by locking grooves of the trays; and a frame-cam having a rack part to be engaged with the cam gear part at one side thereof and cam parts for selectively unlocking the levers at the other side thereof.

Each lever comprises: a hinge part to be inserted upon the rotary shaft; a hook part to be inserted into the locking groove of each tray; and a protrusion part formed at a center of each lever.

Each cam part comprises: a cam groove into which each lever is inserted; a front cam guide extending from a front of the cam groove; a rear cam guide extending from a rear of the cam groove; a guide groove formed between the front cam guide and the rear cam guide; and a step part formed at the center of the front cam guide and the rear cam guide.

Each guide groove is divided into a first guide groove and a second guide groove, and the first guide grooves are formed with lengths diminishing and the second guide grooves are formed with lengths increasing as it goes from the first cam part to the fourth cam part.

When the cartridge is unloaded, four detection protrusions are formed at a side surface of the cartridge at equal intervals in order to withdraw the entire trays in a stairway form, a protrusion sensor is fixedly installed at a side surface of the main frame in order to sense each detection protrusion, a photosensor is installed in the main frame, and a plurality of arc protrusions are formed at an upper surface of the cam gear part corresponding to the photosensor along a circumferential direction at equal intervals.

The photosensor allows rotation of the cam gear part when sensing each arc protrusion and stops rotation of the cam gear part when sensing slits as the cam gear part is rotated at a certain angle.

A rack part is formed in the cartridge, and the rack part is engaged with a cartridge loading gear part.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 8A to 8D are plane views showing the operation of each lever when a three-stage tray is withdrawn in the stack type disk changer of the present invention; and FIGS. 9A to 9D are views showing the operations of each lever and sensors when the entire trays are withdrawn in a stairway form in the stack type disk changer of the present invention.

DETAILED DESCRIPTION OF THE PREFERRED EMBODIMENTS

Figure 1:
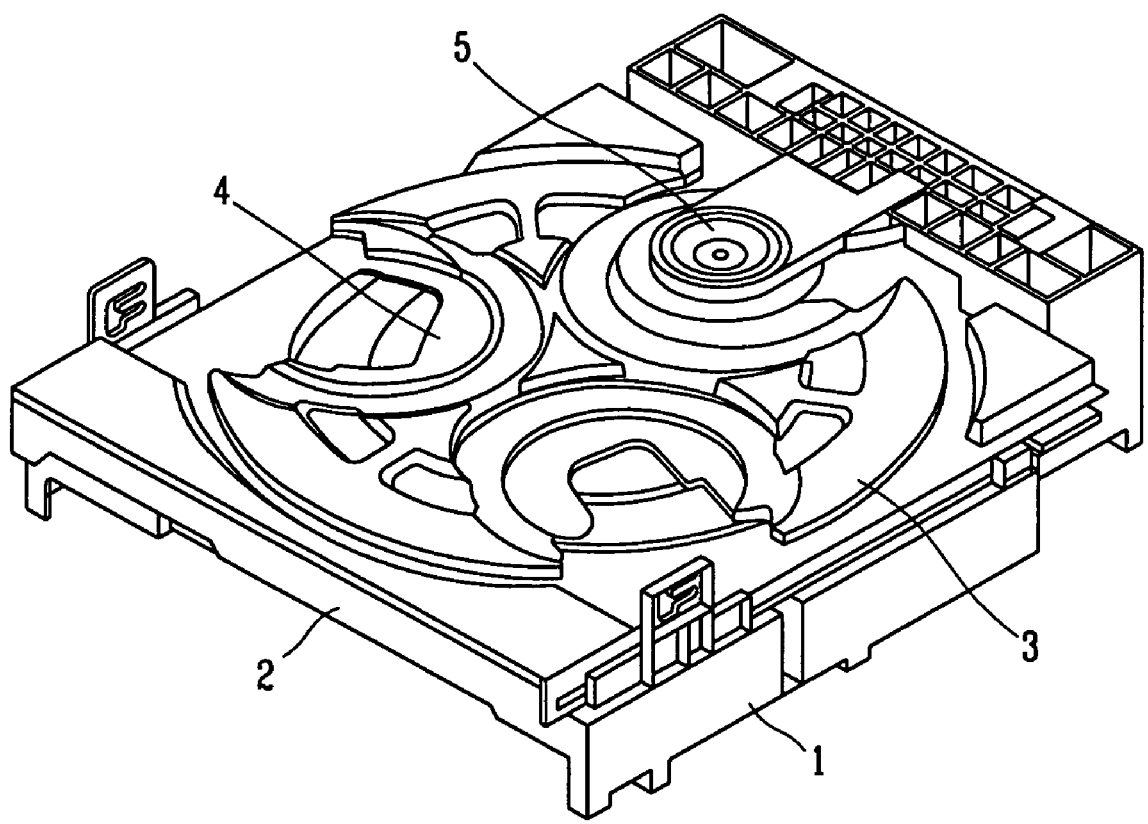
FIG. 1 is a perspective view showing a rotary type disk changer in accordance with a conventional art.
Figure 2:
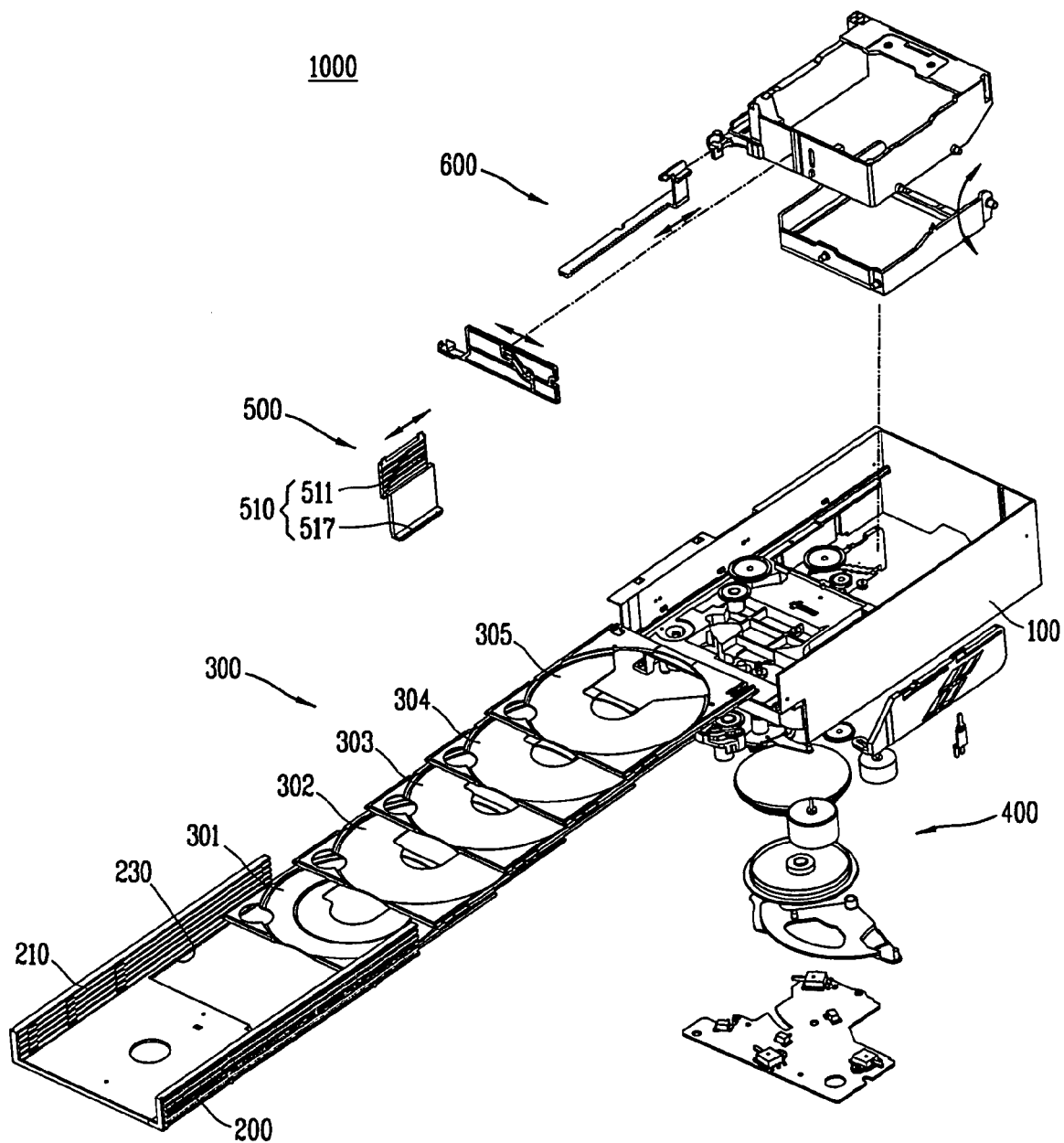
FIG. 2 is an exploded perspective view showing a stack type disk changer in accordance with the present invention.
Figure 3:
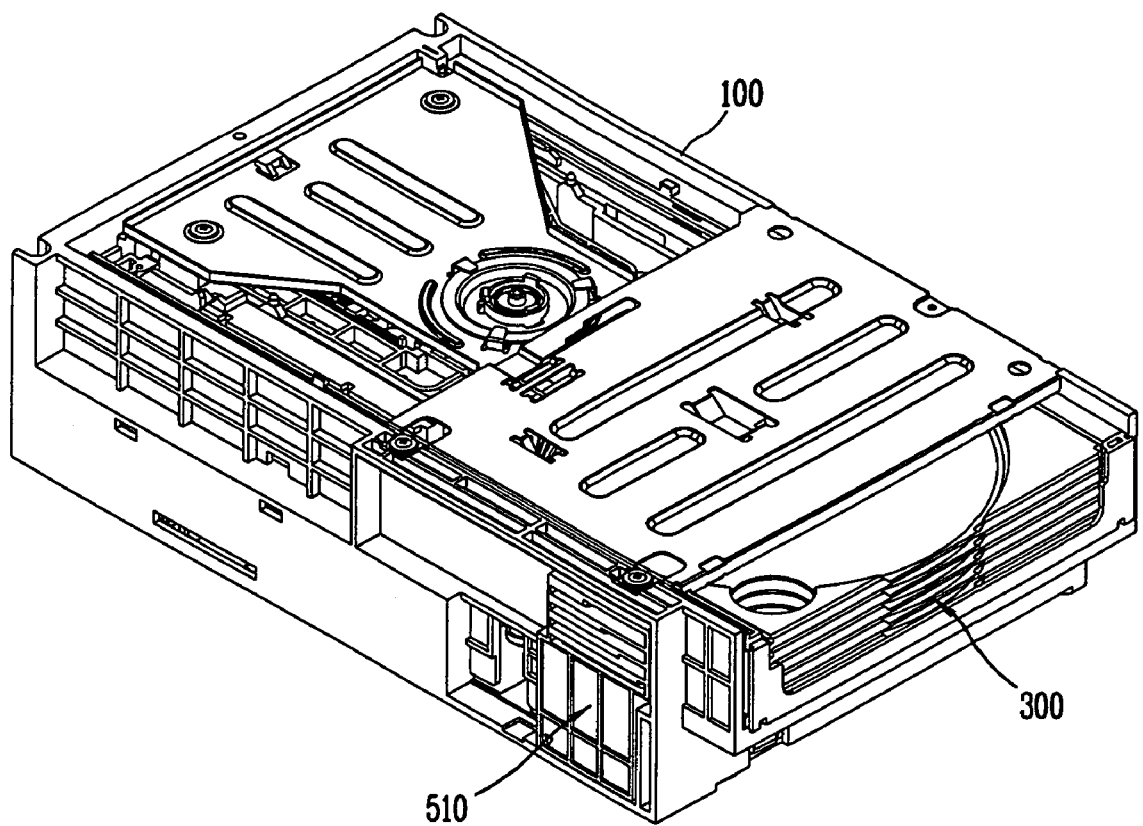
FIG. 3 is an assembled perspective view showing the stack type disk changer in accordance with the present invention.
Figure 4:
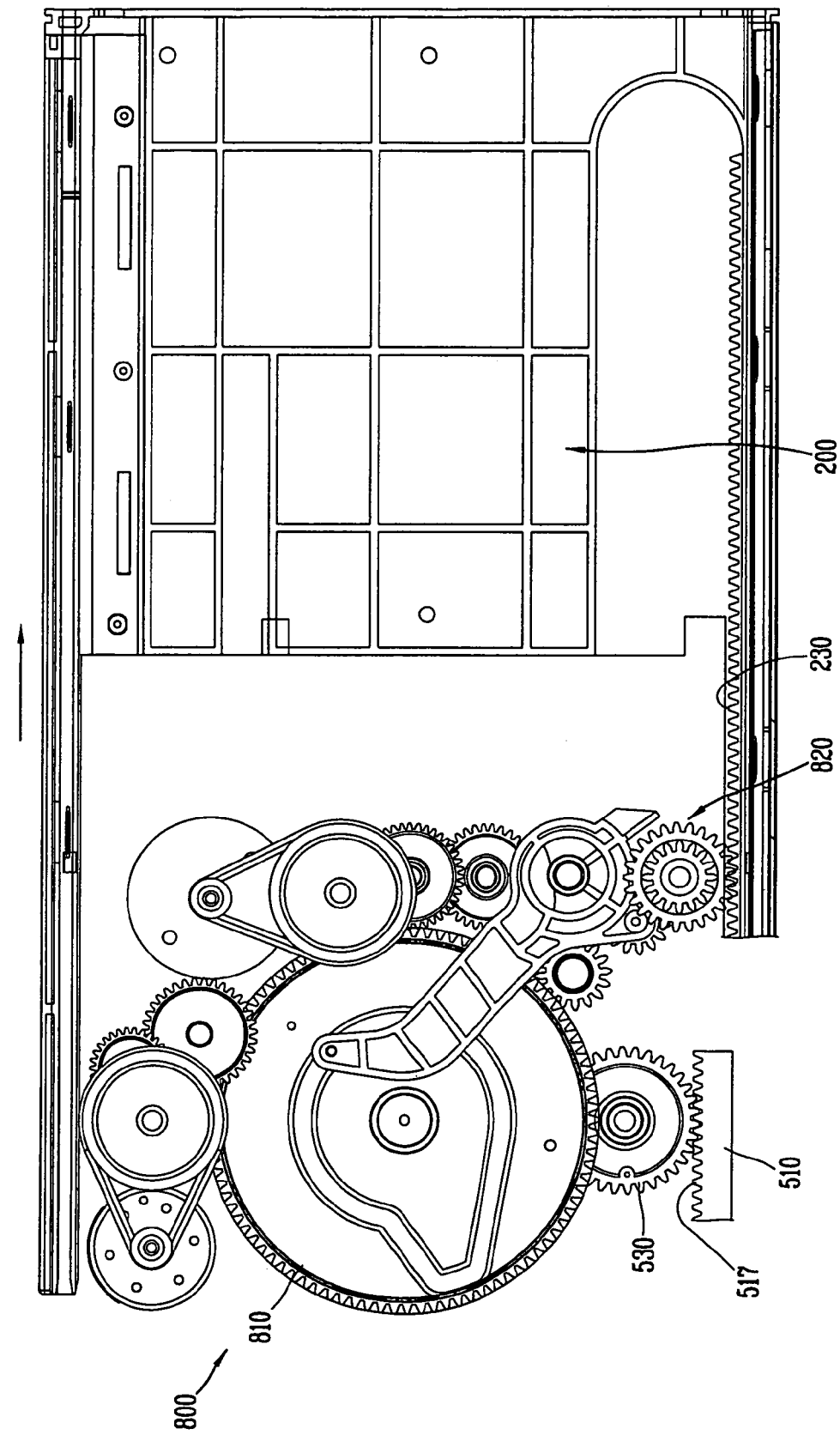
FIG. 4 is a plane view for showing a process of transmitting a driving force by a driving unit and a process of unloading a cartridge in the stack type disk changer of the present invention.
Figure 5:
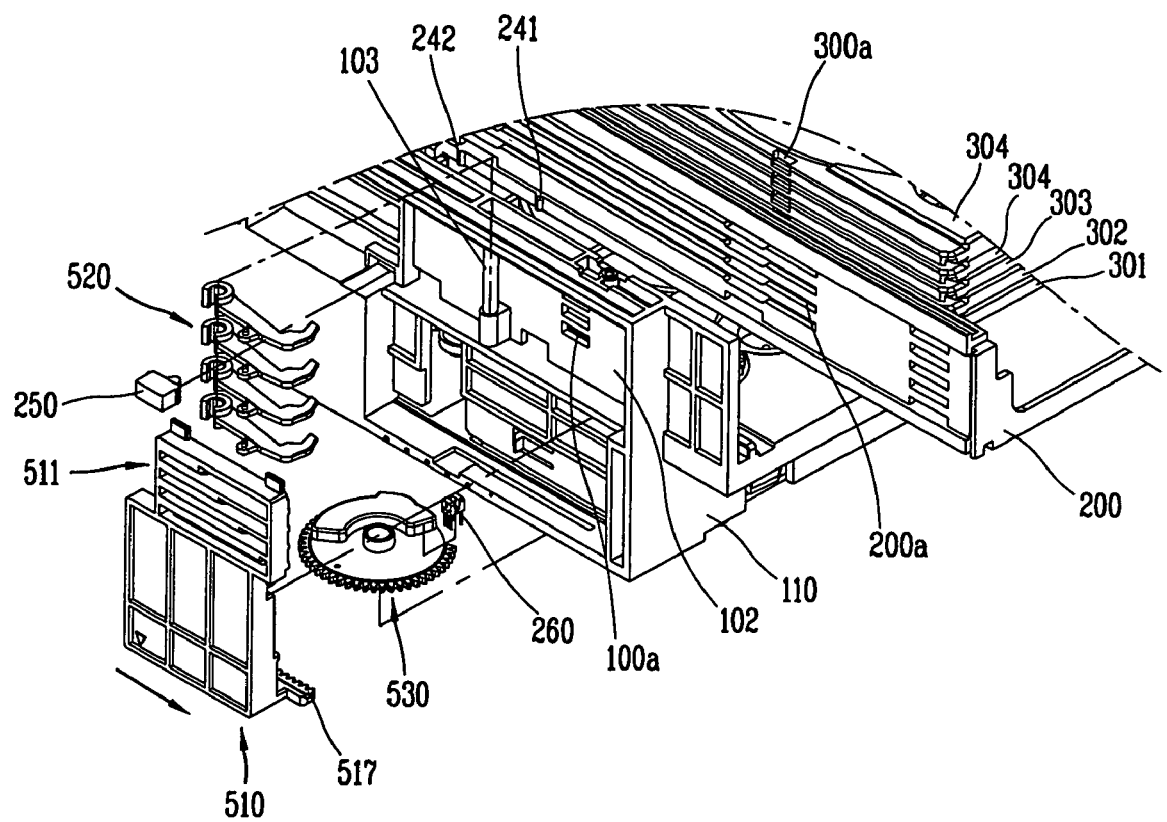
FIG. 5 is an exploded perspective showing an important part of the stack type disk changer of the present invention.

Reference will now be made in detail to the preferred embodiments of the present invention, examples of which are illustrated in the accompanying drawings.

Hereinafter, a preferred embodiment of a stack type disk changer of the present invention will be described, referring to the accompanying drawings.

As shown in FIGS. 2 to 7C, a stack type disk changer 1000 in accordance with a preferred embodiment of the present invention is a stack type disk changer having a five-stage tray, including: a main frame 100; a cartridge 200 slidably installed in the main frame 100; five disk trays 300 slidably and sequentially installed in the cartridge 200; an elevation unit 400 for controlling a height of a turn table (not shown); a tray selecting unit 500 for locking (or holding) the five trays 300 or unlocking a tray a user selects out of the main frame 100; a disk loading unit 600 for loading the tray selected by the user onto the turn table to reproduce/record a disk (not shown) by means of an optical pick-up (not shown); and a driving unit 800 for driving the cartridge 200, the elevation unit 400, the tray selecting unit 500 and the disk loading unit 600.

Hereinafter, since the elevation unit 400, the disk loading unit 600 and the driving unit 800 are general techniques, detailed descriptions therefore are omitted.

A technique related to the tray selecting unit 500, a feature of the present invention, will be only described.

The tray selecting unit 500 withdraws a specific tray or all the trays by arranging the trays in a stairway form. The tray selecting unit 500 includes: a cam gear part 530 rotatably installed at the main frame 100; a plurality of levers (520:521 to 524) rotatably installed at a side surface of the main frame 100 to be locked by locking grooves 300a of the respective trays; and a frame-cam 510 having a rack part 517 to be engaged with the cam gear part 530 at one side thereof and cam parts 511 for selectively unlocking the levers 520 at the other side thereof.

A technique related to the tray selecting unit 500 will be described in more detail.

Firstly, a rack part 230 is formed in the cartridge 200, and the rack part 230 is engaged with a cartridge loading gear part 820 of the driving unit 800. Accordingly, the cartridge 200 can be drawn out of or put in the main frame 100 by rotation of the cartridge loading gear part 820.

The five trays 300 are slidably installed at rails 210 formed at both sides in the cartridge 200 in the front and rear direction of the main frame 100. Here, for the purpose of simplicity, the trays from bottom to top of the cartridge 200 are referred to as a first tray 301, a second tray 302, a third tray 303, a fourth tray 304 and a fifth tray 305.

Each locking groove 300a is formed at one side surface of each tray (300: 301 to 305), and correspondingly to the locking grooves 300a, four through holes 200a are formed at one side surface of the cartridge 200.

A receiving part 102 is formed at one side surface of the main frame 100, and a rotary shaft 103 is perpendicularly inserted into a center inside the receiving part 102.

In addition, through holes 100a are formed at one side of the receiving part 102 in order to correspond to the level through holes 200a. Accordingly, in a state that the cartridge 200 is received in the main frame 100, the through holes 100a of the main frame 100 and the through holes 200a communicate with each other, and hook parts 520a, described later, of the respective levers 520 penetrate the through holes 100a and the through holes 200a, and then are inserted into the locking grooves 300a.

Figure 6:
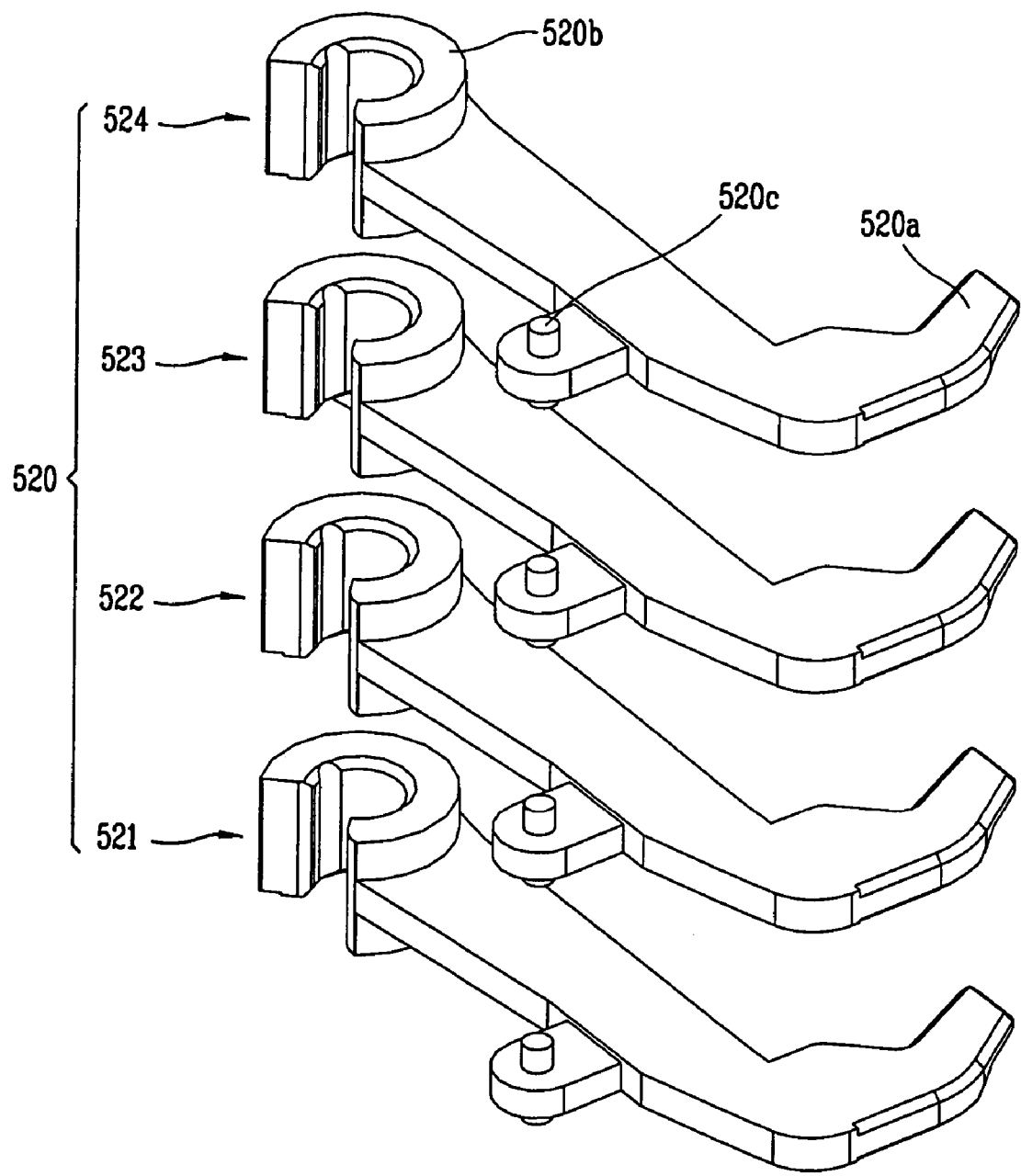
FIG. 6 is an exploded perspective showing a lever in the stack type disk changer of the present invention.

Moreover, with reference to FIG. 6, a construction of each lever 520 will be described in more detail. A hinge part 520b to be inserted upon the rotary shaft 103 is formed at one end of each lever 520, a hook part 520a penetrating each through hole 200a of the cartridge 200 and inserted into each locking groove 300a of each tray 300 is formed at the other end of each lever 520, and a protrusion part 520c to be inserted into each guide groove 515 (refer to FIG. 7C) so as to move along each guide groove 515 is formed at a center of each lever 520.

Herein, for the purpose of simplicity, the levers from the lowermost lever to the uppermost lever are referred to as a first lever 521, a second lever 522, a third lever 523 and a fourth lever 524.

The frame-cam 510, a component of the tray selecting unit 500, is slidably installed at the receiving part 102 in the front and rear direction of the main frame 100.

As described above, the frame-cam 510 includes the cam parts formed at its upper portion 511, for respectively mounting four levers 520, and the rack part 517 formed at its lower portion. For the purpose of simplicity, the cam parts from bottom to top of the frame-cam 510 are referred to as a first cam part 511a, a second cam part 511b, a third cam part 511c, and a fourth cam part 511d. The cam gear part 530 is engaged with the rack part 517 formed at the lower portion of the frame cam 510, and the cam gear part 530 is engaged with the driving cam 810 of the driving unit 800. Accordingly, when the driving cam 810 of the driving unit 800 rotates, the cam gear part 530 connected to the driving cam 810 rotates and slidingly moves the frame-cam 510 in the front and rear direction of the main frame 100.

For reference, when only the first tray 301 among the five trays (300: 301 to 305) is drawn out of the main frame 100, the first tray 301 alone is withdrawn by locking the second tray 302 to the fifth tray 305 when the cartridge 200 is unloaded. Therefore, the locking groove at a side surface of the first tray 301 is not necessary, and the lever and the cam part corresponding to this are not necessary, either.

Accordingly, the cam parts 511 are made up of the first cam part 511a to the fourth cam part 511d, and the levers 520 are made up of the first lever 521 to the fourth lever 524. The second tray 302 corresponds to the first cam part 511a and the first lever 521, the third tray 303 the second cam part 511b and second lever 522, the fourth tray 304 the third cam part 511c and the third lever 523, and the fifth tray 305 the fourth cam part 511d and the fourth lever 524.

Figure 7A:
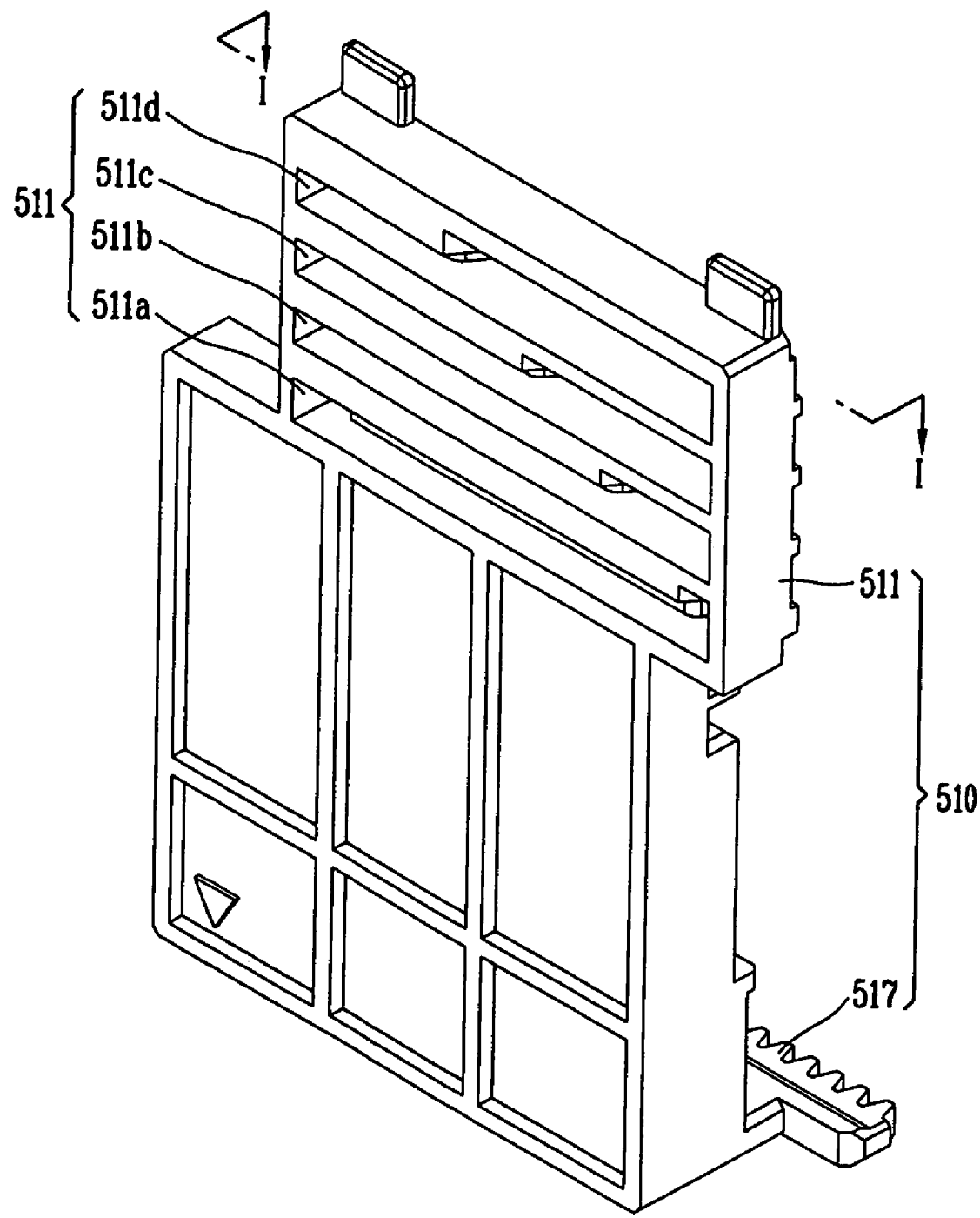
FIG. 7A is a perspective view showing an outer part of a frame-cam in the stack type disk changer of the present invention.
Figure 7B:
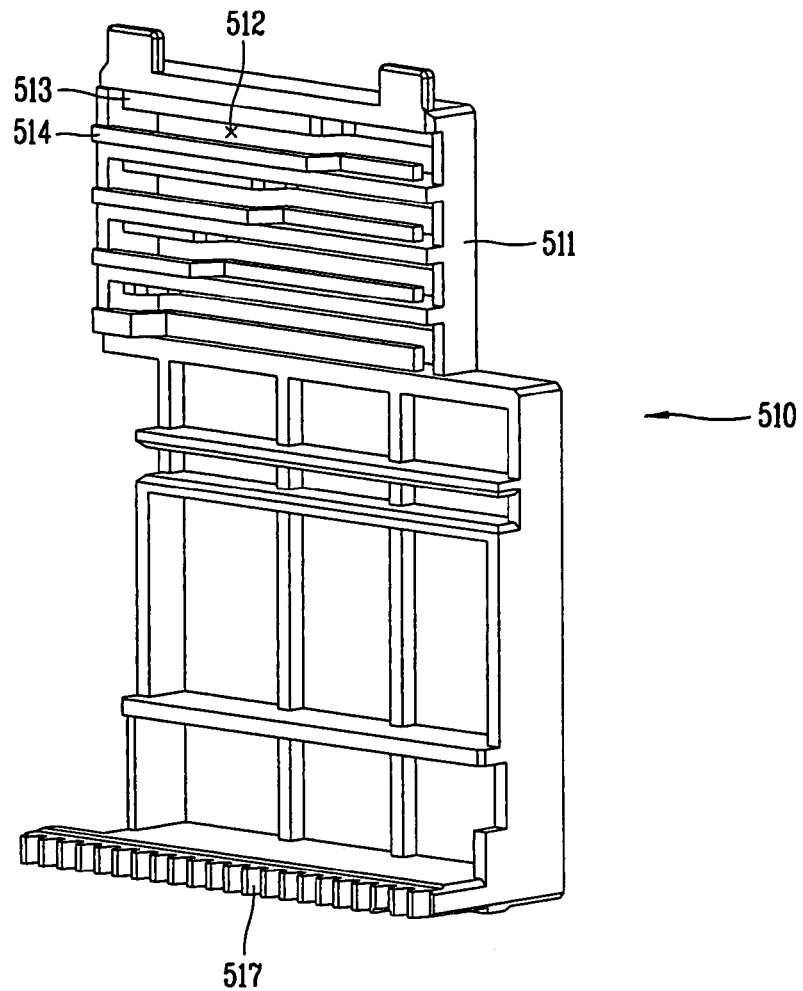
FIG. 7B is a perspective view showing an inner part of the frame-cam in the stack type disk changer of the present invention.
Figure 7C:
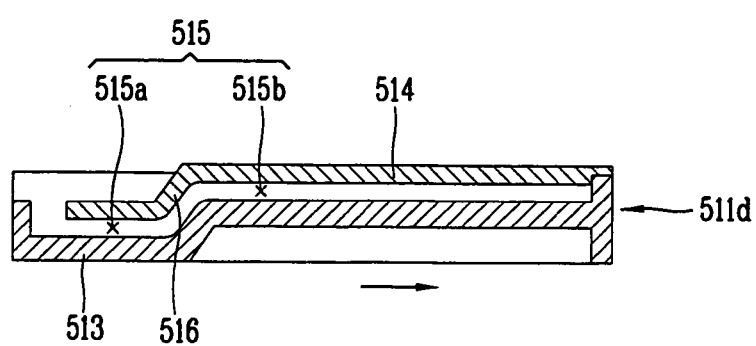
FIG. 7C is a plane sectional view taken along line I-I of FIG. 7A.

With reference to FIGS. 7A to 7C, a construction of the cam part 511 will be described in more detail. Four cam grooves 512 are formed at equal intervals from the lowermost cam groove to the uppermost cam groove, a front cam guide 513 and a rear cam guide 514 are individually extended from a front and a rear of each cam groove 512, and a guide groove 515 is formed therebetween. Also, a step part 516 is formed at the center of the front cam guide 513 and the rear cam guide 514.

Hereinafter, a structure in which each lever is coupled with each cam part will be described in detail.

As the hinge parts 520b are inserted upon the rotary shaft 103, each lever 520 is rotatably installed on the basis of the rotary shaft 103, each hook part 520a penetrates each through hole 100a and 200a and can be inserted into or released from each locking groove 300a of each tray 300, and the protrusion part 520c slidingly moves along each guide groove 515.

For instance, when the levers are unlocked, if the cam parts 511 of the frame-cam 510 move toward a front side, the protrusion parts 520c of the levers 520 move along the guide grooves 515. At this time, the protrusion parts 520c are stopped by the step parts 516 to thereby rotate the levers 520 centering on the rotary shafts 103, whereby the hook parts 520a are released from the locking grooves 300a of the trays 300.

In addition, each guide groove 515 is divided into a first guide groove 515a and a second guide groove 515b. The first guide grooves 515a are formed with lengths diminishing and the second guide grooves 515b are formed with lengths increasing as it goes from the first cam part 511a to the fourth cam part 511d.

Accordingly, when the frame-cam 510 moves from a rear side to a front side of the main frame 100 at a certain distance by the driving unit, sequentially the protrusion parts 520c of the respective levers 520 slidingly move along the second guide grooves 515b and the first guide grooves 515a, whereby each lever 520 is rotated clockwise centering around the hinge part 520b and each hook part 520a of each lever 520 is released from each locking groove 300a.

That is, as described above, in case of the cam parts 511, since the first guide grooves 515a are formed with lengths diminishing and the second guide grooves 515b are formed with lengths increasing as it goes from the first cam part 511a to the fourth cam part 511d, specific levers are unlocked according to a position of the frame-cam 510. Therefore, when the cartridge 200 is unloaded by the cartridge loading gear part 820, only unlocked trays are drawn out of the main frame 100 together with the cartridge 200.

In addition, when the cartridge is unloaded, four detection protrusions 241 to 244 are formed at a side surface of the cartridge 200 at equal intervals in order to withdraw the entire trays in a stairway form, and a protrusion sensor 250 is fixedly installed at a side surface of the main frame 100 in order to sense each detection protrusion 241 to 244. And, a photosensor 260 is installed at a main PCB (not shown) installed in the main frame 100, and a plurality of arc protrusions are formed at an upper surface of the cam gear part 530 corresponding to a position of the photosensor 260 along a circumferential direction at equal intervals.

The photosensor 260 is for controlling an rotation angle of the cam gear part 530, and senses each arc protrusion 531 formed at the upper surface of the cam gear part 530.

The photosensor 260 allows rotation of the cam gear part 530 only when sensing each arc protrusion 531 and stops rotation of the cam gear part 530 when sensing slits as the cam gear part 530 is rotated at a certain angle.

In other words, in case that a specific tray, for example, the third tray 303 is withdrawn, the cam gear part 530 is rotated at a certain angle to thereby slide the frame-cam 510 engaged with the cam gear part 530 to the proper position, whereby the first lever 251 and the second lever 252 are unlocked. At this time, as the second tray 302 and the third tray 303 are unlocked together with the first tray 301, the specific tray 303 selected by the user is withdrawn when unloading the cartridge 200.

In addition, as the cartridge 200 is unloaded, whenever the protrusion sensor 250 senses each detection protrusion 241 to 244, the cam gear part 530 slides the frame-cam 510 to thereby sequentially unlock the first lever 521 to the fourth lever 524, and then the trays 301 to 305 locked by the first lever 521 to the fourth lever 524 are sequentially locked, whereby the entire trays are arranged in a stairway formed and are withdrawn.

The operation of the stack type disk changer having such a construction will be described in more detail.

Firstly, with reference to FIGS. 8A to 8D, for instance, the operation when the third tray 303 is intended to be drawn out of the main frame 100 to exchange a disk mounted on the third tray 303 will be described as follows.

When the driving cam 810 of the driving unit 800 rotates, the cam gear part 530 connected to the driving cam 810 rotates to thereby slidingly move the frame-cam 510 at a front side of the main frame 100. Here, the rotation angle of the cam gear part 530 is determined by the arc protrusions 531 and the photosensor 260 for sensing the arc protrusions 531.

Figure 8A:
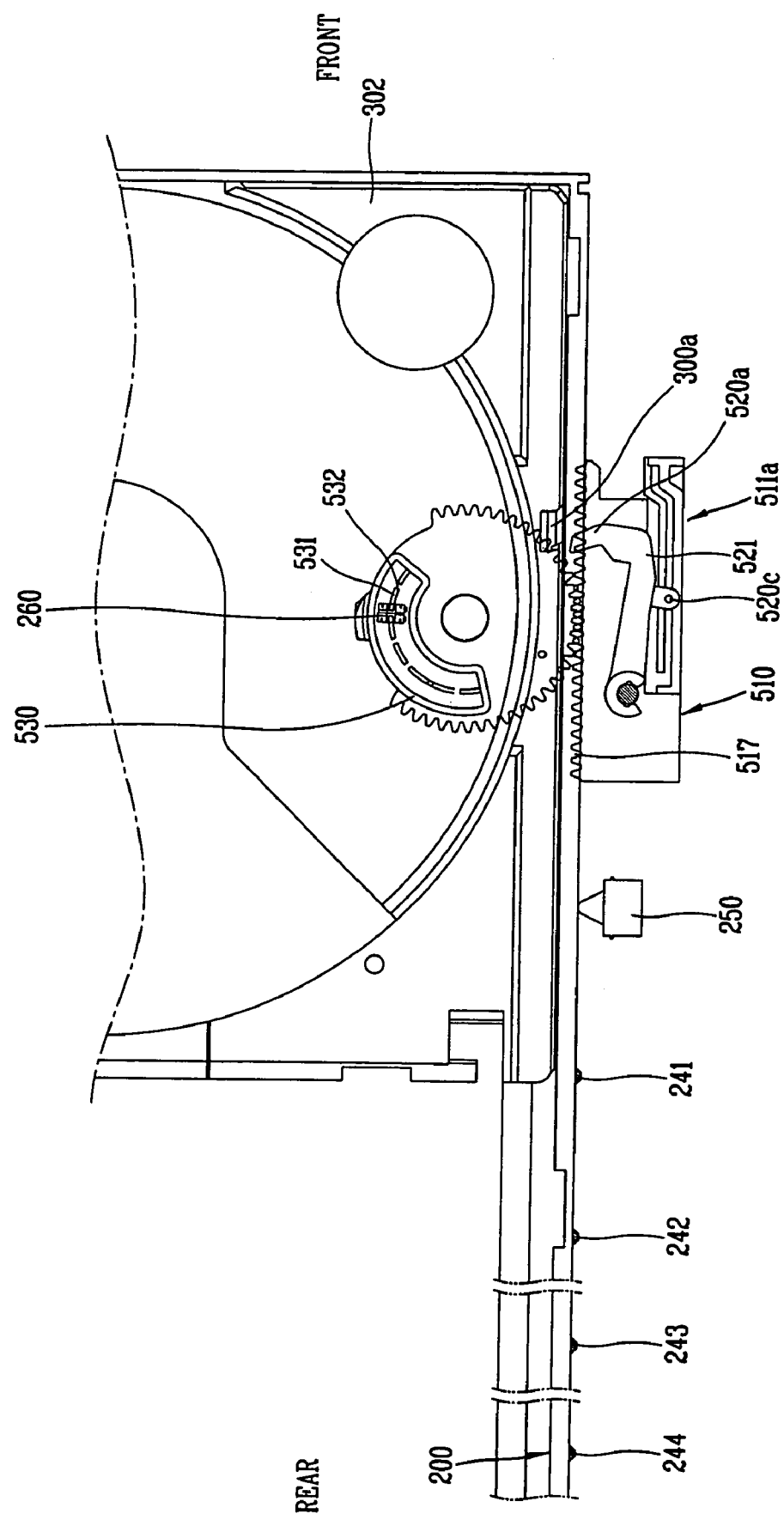
Figure 8C:
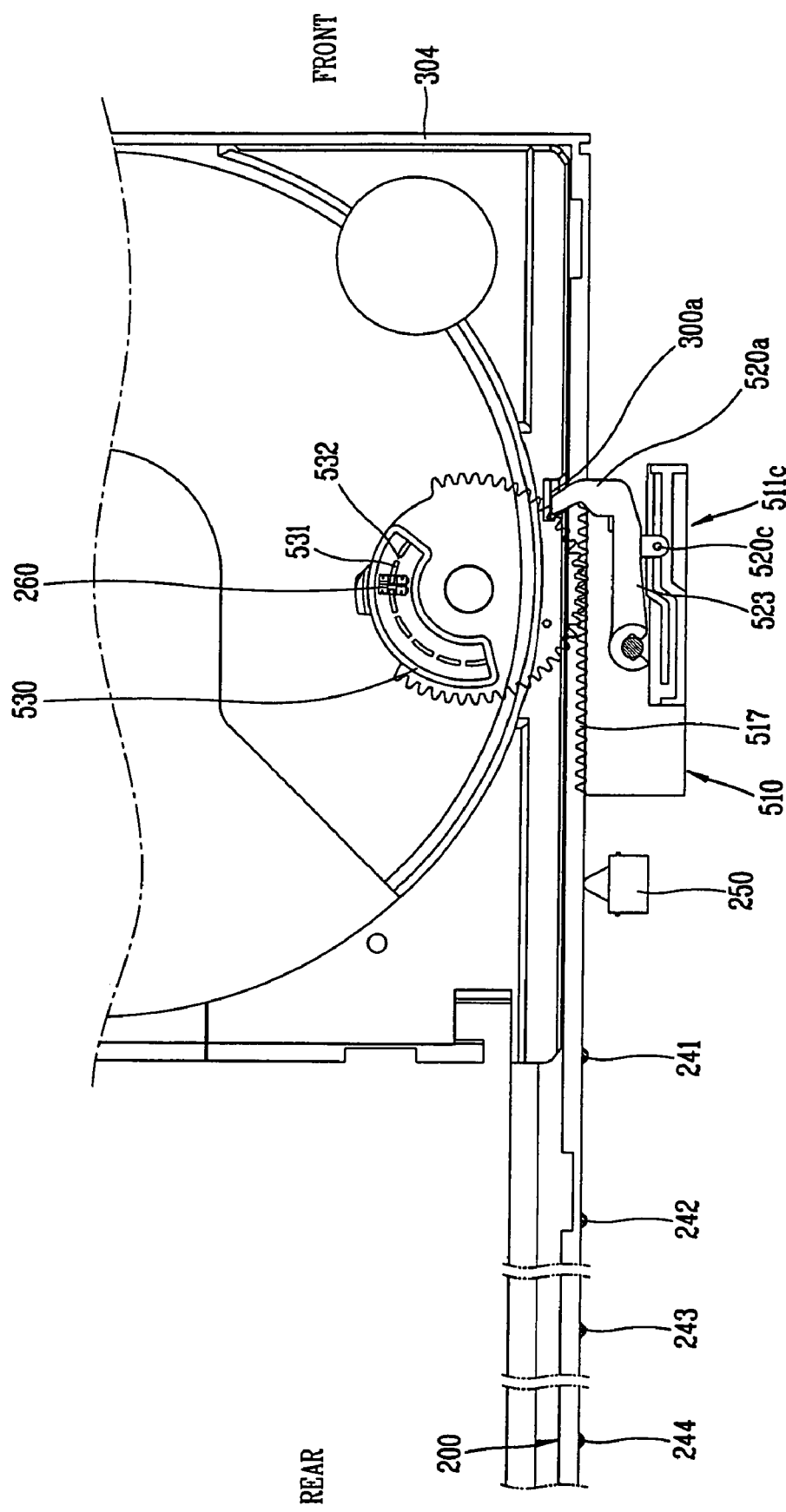
Figure 8D:
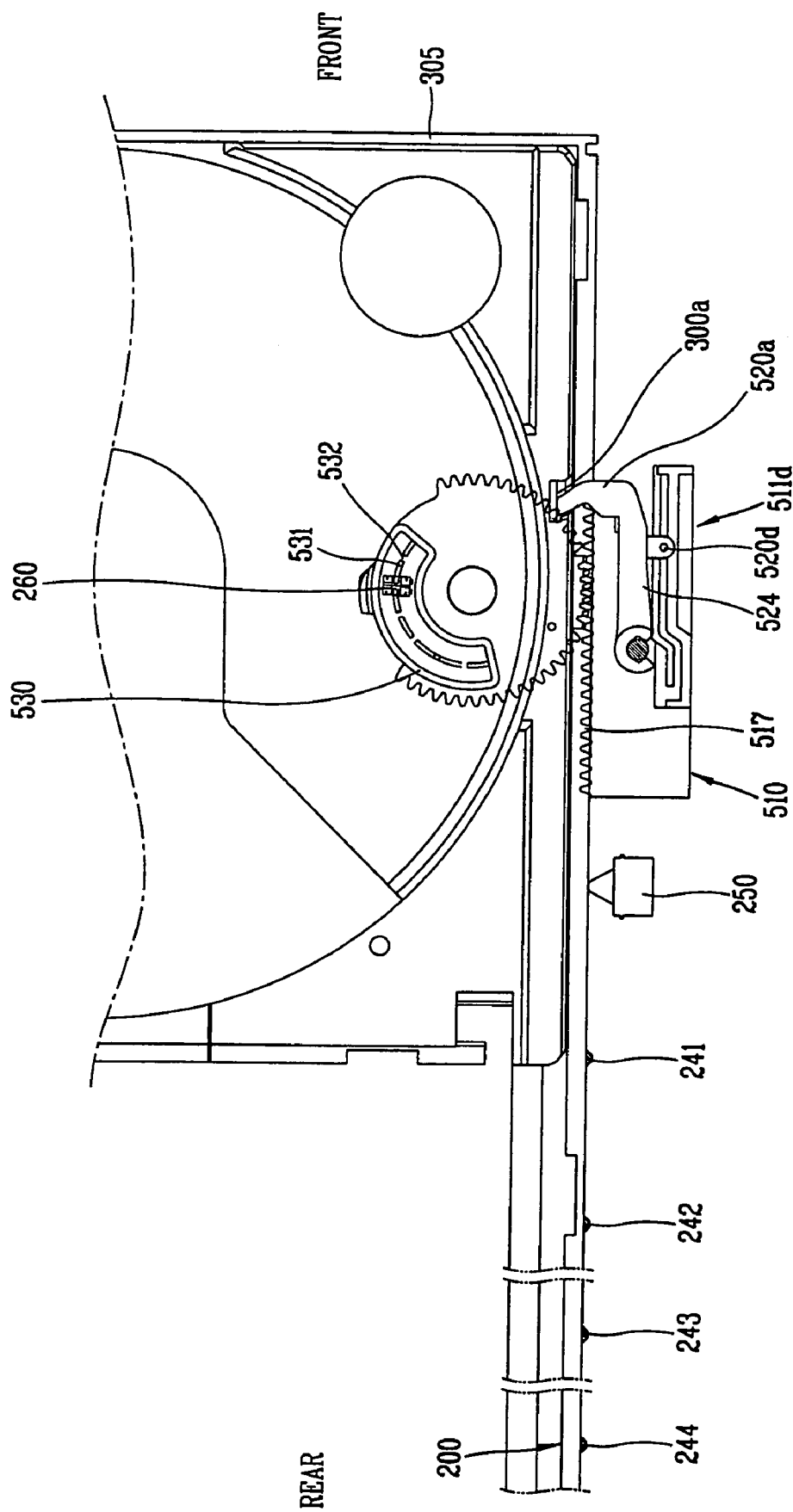

At this time, as the frame-cam 510 is slid, as shown in FIGS. 8C to 8D, the third lever 523 and the fourth lever 524 are locked, and as shown in FIGS. 8A and 8B, the first lever 521 and the second lever 522 are properly positioned to be unlocked. In other words, the hook parts 520a of the third lever 523 and the fourth lever 524 are inserted into the locking grooves 300a, and the hook parts 520a of the first lever 521 and the second lever 522 are released from the locking grooves 300a.

A position of the frame-cam 510 is controlled by the preset rotation angle of the driving cam 810 of the driving unit 800.

When the first lever 521 and the second lever 522 are unlocked, the cartridge loading gear part 820 interworking with the cam gear part 530 and engaged with the rack part 517 rotates to thereby draw the cartridge 200 out of the main frame 100. At this time, the fourth tray 304 and the fifth tray 305 are locked and thus do not move, while the unlocked first tray 301 to third tray 303 are drawn out of the main frame 100 together with the cartridge 200 in a state that the third tray 303 is stacked at the top.

Reversely, a process of putting the trays having been drawn out of the main frame 100 in the main frame 100 is performed in the opposite order.

Meanwhile, with reference to FIGS. 9A to 9D, the operation that the user draws the entire trays in a stairway form out of the main frame will be described as follows.

When the driving cam 810 of the driving unit 800 operates to thereby rotate the cartridge loading gear part 820, the cartridge 200 starts to be drawn out of the main frame 100 by the cartridge loading gear part 820. At this time, since the hook parts 520a of the first lever 521 to the fourth lever 524 are inserted into the locking grooves 300a of the second tray 302 to the fifth tray 305, the second tray 302 to the fifth tray 305 are locked, while the first tray 301 which is not restricted by the lever starts to be drawn out of the main frame 100 together with the cartridge 200.

Figure 9A:
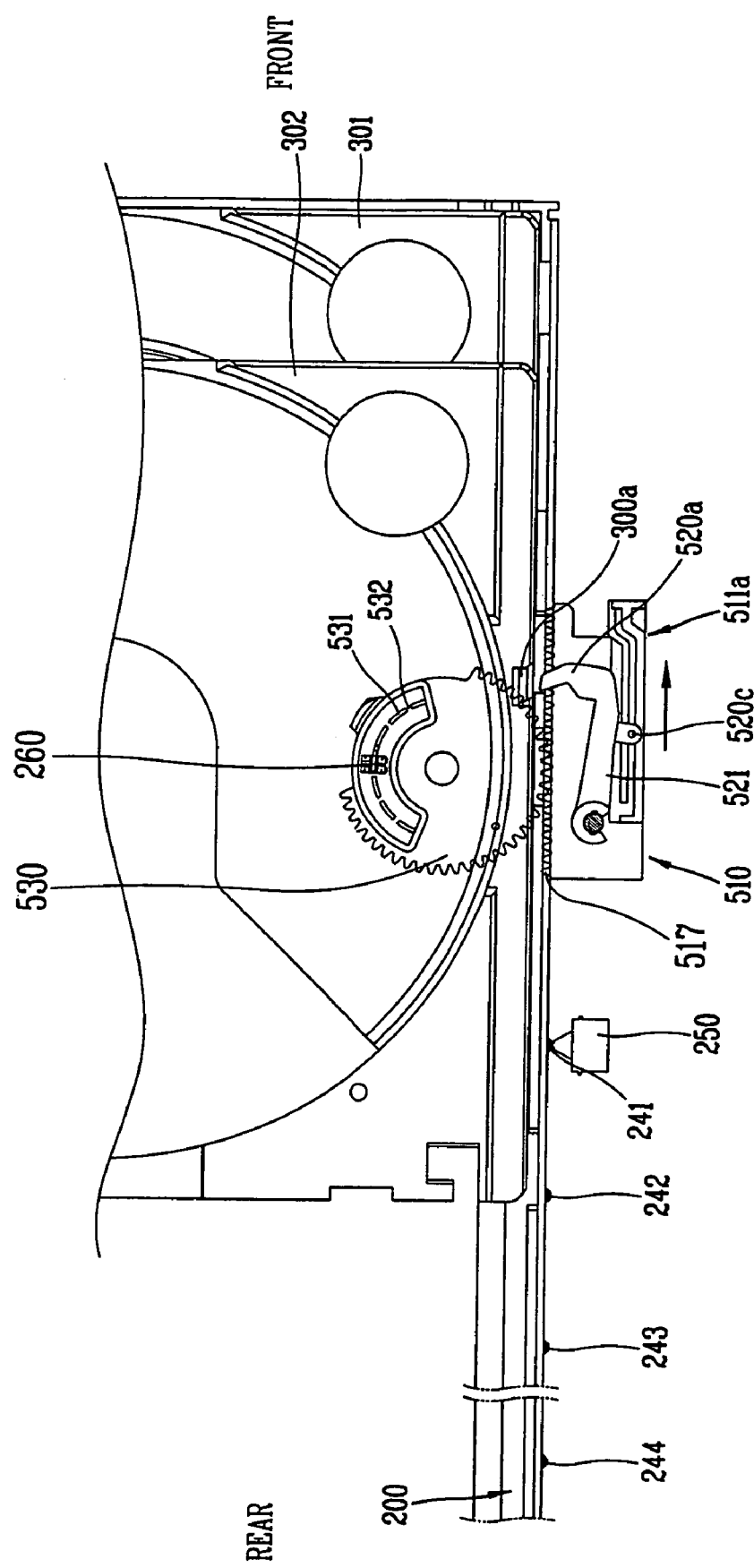

As shown in FIG. 9A, when the cartridge 200 moves forward and the protrusion sensor 250 senses the first detection protrusion 241, the driving cam 810 rotates to thereby rotate the cam gear part 530 at a certain angle. At this time, the photosensor 260 controls the rotation angle of the cam gear part 530 by sensing slits 532 at both ends of each arc protrusion 531. At this time, by the rotation of the cam gear part 530, the came frame 510 slidingly moves toward a front side to thereby unlock the first lever 521. The second tray 302 released by unlocking the first lever 521 starts to be drawn out of the main frame 100 together with the cartridge 200.

Subsequently, as shown in FIG. 9B, if the cartridge 200 moves forward and the protrusion sensor 250 senses the second detection protrusion 242, the driving cam 810 rotates to thereby rotate the cam gear part 530 at a certain angle. At this time, the photosensor 260 controls the rotation angle of the cam gear part 530 by sensing slits 532 at both ends of each arc protrusion 531. At this time, by the rotation of the cam gear part 530, the came frame 510 slidingly moves to thereby unlock the second lever 522. The third tray 303 released by unlocking the second lever 522 starts to be drawn out of the main frame 100 together with the cartridge 200.

Figure 9C:
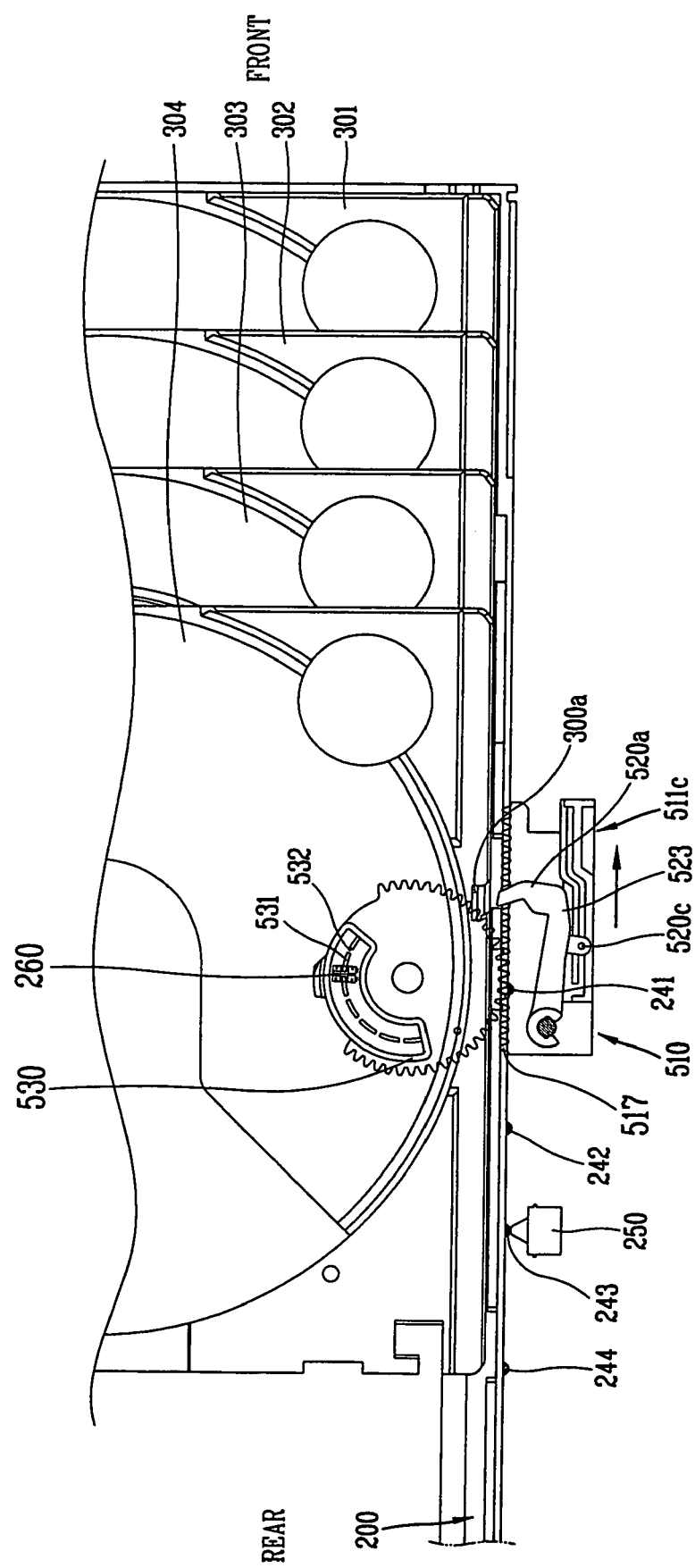

Subsequently, as shown in FIG. 9C, if the cartridge 200 more moves forward and the protrusion sensor 250 senses the third detection protrusion 243, the driving cam 810 rotates to thereby rotate the cam gear part 530 at a certain angle. At this time, the photosensor 260 controls the rotation angle of the cam gear part 530 by sensing slits 532 at both ends of each arc protrusion 531. At this time, by the rotation of the cam gear part 530, the came frame 510 slidingly moves to thereby unlock the third lever 523. The fourth tray 304 released by unlocking the third lever 523 starts to be drawn out of the main frame 100 together with the cartridge 200.

Figure 9D:
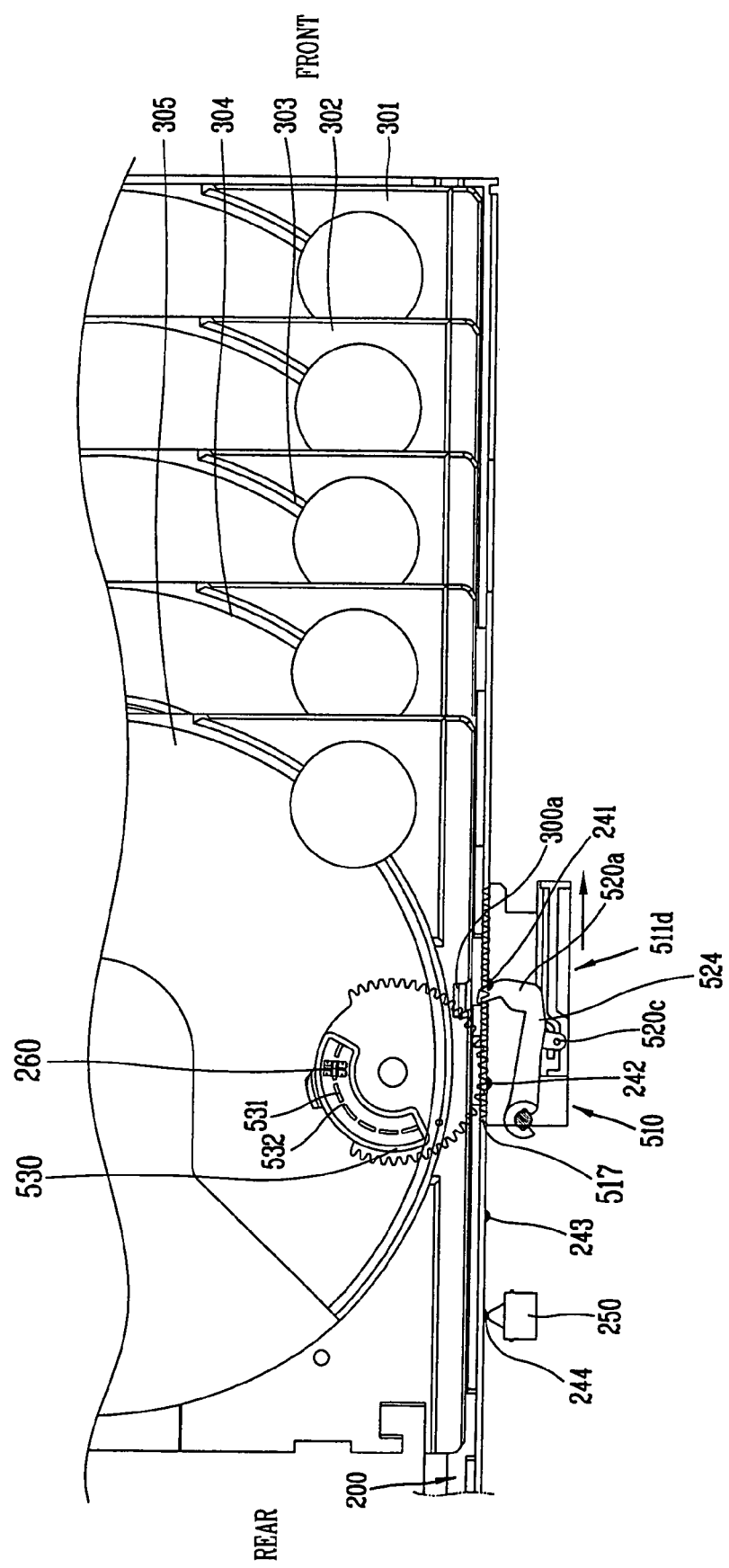

Lastly, as shown in FIG. 9D, if the cartridge 200 more moves forward and the protrusion sensor 250 senses the fourth detection protrusion 244, the driving cam 810 rotates to thereby rotate the cam gear part 530 at a certain angle. At this time, the photosensor 260 controls the rotation angle of the cam gear part 530 by sensing slits 532 at both ends of each arc protrusion 531. At this time, by the rotation of the cam gear part 530, the came frame 510 slidingly moves to thereby unlock the fourth lever 524. The fifth tray 305 released by unlocking the fourth lever 523 starts to be drawn out of the main frame 100 together with the cartridge 200.

As described, after the first tray 301 to the fifth tray 305 are sequentially unlocked, they are drawn out of the main frame 100 together with the cartridge 200. Accordingly, as shown in FIG. 10, the entire trays are arranged in a stairway form.

Reversely, a process of putting the trays having been drawn out of the main frame 100 in the main frame 100 is performed in the opposite order to the above-described operation.

As so far described, a stack type disk changer is capable of not only designed to have a relatively small overall size and to be simple and mounting more many disks thereon, but also allowing a user to easily withdraw a desired tray and check disks mounted on the respective trays by withdrawing the entire trays in a stairway form.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A stack type disk changer comprising:
   a main frame;
   a cartridge slidably installed in the main frame;
   a plurality of trays slidably and sequentially arranged in the cartridge, each of the plurality of trays having locking grooves at side surfaces thereof;
   a tray selecting unit installed at a side surface of the main frame such that a specific tray among the plurality of trays can be unlocked when the cartridge is unloaded; and
   a driving unit installed in the main frame for driving the tray selecting unit,
   wherein through holes are formed at a side surface of the cartridge corresponding to the locking grooves, and through holes are formed at a side surface of the main frame in order to correspond to the through holes on the cartridge.

2. The stack type disk changer of claim 1, wherein a receiving part is formed at a side surface of the main frame, and a rotary shaft is perpendicularly inserted into the receiving part.

3. The stack type disk changer of claim 1, wherein the through holes formed at the main frame and the through holes formed at the cartridge communicate with each other when the cartridge is received in the main frame.

4. The stack type disk changer of claim 1, wherein the tray selecting unit ejects a specific tray selected by a user or the plurality of trays out of the main frame by arranging the selected specific tray or the plurality of trays in a stair form such that individual disks of each of the plurality of trays can be checked by the user.

5. The stack type disk changer of claim 1, wherein the tray selecting unit comprises:
   a cam gear part rotatably installed at the main frame;
   a plurality of levers rotatably installed at a side surface of the main frame for locking with the locking grooves of the plurality of trays; and
   a frame-cam having a rack part for engaging the cam gear part at a first side of the frame-cam and cam parts for selectively unlocking the plurality of levers at a second side of the frame-cam.

6. The stack type disk changer of claim 5, wherein the cam gear part engages a driving cam of the driving unit.

7. The stack type disk changer of claim 5, wherein each of the plurality of levers comprises:
   a hinge part for insertion into a rotary shaft;
   a hook part for insertion into a locking groove of each of the plurality of trays; and
   a protrusion part formed at a center of each of the plurality of levers.

8. The stack type disk changer of claim 7, wherein the plurality of levers comprises a first lever, a second lever, a third lever and a fourth lever placed in order from bottom to top of the plurality of levers.

9. The stack type disk changer of claim 5, wherein the frame-cam comprises a first cam part, a second cam part, a third cam part and a fourth cam part placed in order from bottom to top of the frame-cam.

10. The stack type disk changer of claim 9, wherein each cam part comprises:
   a cam groove into which one of the plurality of levers is inserted;
   a front cam guide extending from a front of the cam groove;
   a rear cam guide extending from a rear of the cam groove;
   a guide groove formed between the front cam guide and the rear cam guide; and
   a step part formed at a center of the front cam guide and the rear cam guide.

11. The stack type disk changer of claim 10, wherein the guide groove of each cam part is divided into a first guide groove and a second guide groove, the first guide groove of subsequent cam parts decreasing in length and the second guide groove of subsequent cam parts increasing in length in order from the first cam part to the fourth cam part such that the first guide groove of the first cam part is longer than the first guide groove of the fourth cam part and the second guide groove of the first cam part is shorter than the second guide groove of the fourth cam part.

12. The stack type disk changer of claim 1, further comprising:
   a protrusion sensor fixedly installed at a side surface of the main frame;
   a photosensor installed in the main frame; and
   a plurality of arc protrusions formed at an upper surface of a cam gear part corresponding to the photosensor along a circumferential direction at equal intervals,
   wherein when the cartridge is unloaded, four detection protrusions formed at a side surface of the cartridge at equal intervals allow withdrawal of the plurality of trays in a stair form and the protrusion sensor senses each of the four detection protrusions.

13. The stack type disk changer of claim 12, wherein the photosensor allows rotation of the cam gear part when sensing each of the plurality of arc protrusions and stops rotation of the cam gear part when sensing slits as the cam gear part is rotated at a certain angle.

14. The stack type disk changer of claim 1, wherein a rack part is formed in the cartridge and the rack part engages a cartridge loading gear part.

15. The stack type disk changer of claim 1, wherein the cartridge is drawn in and out of the main frame by rotation of a cartridge loading gear part.

16. The stack type disk changer of claim 1, wherein the plurality of trays are slidingly installed at rails formed at both ends of the cartridge in a front and rear direction of the main frame.

17. A stack type disk changer comprising:
   a main frame;
   a cam gear part rotatably installed at a lower portion of the main frame such that a specific tray among a plurality of trays can be unlocked when a cartridge is unloaded;
   a plurality of levers rotatably installed at a side surface of the main frame in order to engage locking grooves formed at side surfaces of the plurality of trays; and
   a frame-cam slidably installed at a side surface of the main frame, and having a rack part engaging the cam gear part at a first side of the frame-cam and a plurality of cam parts for selectively unlocking the plurality of levers at a second side of the frame-cam.

18. The stack type disk changer of claim 17, wherein through holes are formed at one side surface of the cartridge, each through hole corresponding to a locking groove, and through holes are formed at one side surface of the main frame, the through holes corresponding to the through holes of the cartridge.

19. The stack type disk changer of claim 18, wherein a receiving part is formed at one side surface of the main frame, and a rotary shaft is perpendicularly inserted into a center of the receiving part.

20. The stack type disk changer of claim 17, wherein each of the plurality of levers comprises:
   a hinge part for insertion into a rotary shaft;
   a hook part for insertion into a locking groove of each of the plurality of trays; and
   a protrusion part formed at a center of each of the plurality of levers.

21. The stack type disk changer of claim 17, wherein each cam part comprises:
   a cam groove;
   a front cam guide extending from a front of the cam groove;
   a rear cam guide extending from a rear of the cam groove;
   a guide groove formed between the front cam guide and the rear cam guide; and
   a step part formed at a center of the front cam guide and the rear cam guide.

22. The stack type disk changer of claim 21, wherein each guide groove of each cam part is divided into a first guide groove and a second guide groove, the first guide groove of subsequent cam parts decreasing in length and the second guide groove of subsequent cam parts increasing in length in order from a first cam part to a fourth cam part such that the first guide groove of the first cam part is longer than the first guide groove of the fourth cam part and the second guide groove of the first cam part is shorter than the second guide groove of the fourth cam part.

23. The stack type disk changer of claim 17, further comprising:
   a protrusion sensor fixedly installed at a side surface of the main frame;
   a photosensor installed in the main frame; and
   a plurality of arc protrusions formed at an upper surface of a cam gear part corresponding to the photosensor along a circumferential direction at equal intervals,
   wherein when the cartridge is unloaded, four detection protrusions formed at a side surface of the cartridge at equal intervals allow withdrawal of the plurality of trays in a stair form and the protrusion sensor senses each of the four detection protrusions.

24. The stack type disk changer of claim 23, wherein the photosensor allows rotation of the cam gear part when sensing each of the plurality of arc protrusions and stops rotation of the cam gear part when sensing slits as the cam gear part is rotated at a certain angle.

25. The stack type disk changer of claim 17, wherein a rack part is formed in the cartridge and the rack part engages a cartridge loading gear part.

* * * * *